3,284,329
NOVEL PROCESS FOR THE PRODUCTION OF
CATALYST COMPONENTS
Victor D. Aftandilian, Watertown, Mass., assignor to
Cabot Corporation, Boston, Mass., a corporation of
Delaware
No Drawing. Filed Jan. 21, 1963, Ser. No. 252,585
20 Claims. (Cl. 204—157.1)

This invention relates to polymerization catalysts and in particular to a process for producing the polymerization catalyst components.

Accordingly, it is a principal object of the present invention to provide a novel process for producing polymerization catalyst components.

Other objects of the present invention will in part be obvious and will in part appear hereinafter.

It has been disclosed, for example, in U.S. Patent application, Serial No. 2,861, filed January 18, 1960, now abandoned, and Serial No. 21,110, filed April 11, 1960, now abandoned, both by Orzechowski and MacKenzie, that inorganic solids bearing chemically combined on the surface, surface structures comprising

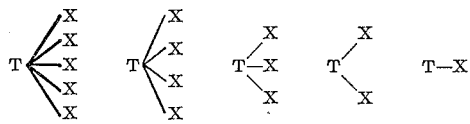

where T is a metal chosen from the group consisting of the metals of Groups IVa, Va and VIa; each X is any halogen; and where said structures are linked directly from T to at least one oxygen atom on the surface of the inorganic solid, comprise superior catalyst components. In accordance with said patent applications, said catalyst components are produced by reacting a halide type compound of a Group IVa, Va and VIa metal with hydroxyl groups on the surface of a finely-divided inorganic solid.

Suitable halide-type compounds of Group IVa, Va and VIa metals hereinafter generally referred to as transition metal halides) include the compounds conforming to the general empirical formula:

$$TO_aX_b$$

wherein T is a metal of Groups IVa, Va or VIa (where the group numbers correspond to the Mendeleev Periodic System); O is oxygen; $a$ is a number from 0 to 2; each X is any halogen; and $b$ is a number from 1 to 6. Examples of specific compounds conforming to said general formula are halides of Groups IVa, Va or VIa metals such as titanium tetrachloride, zirconium tetrachloride, vanadium tetrachloride and the titanium tetraiodide, and oxyhalides of Group IVa, Va or VI metals, such as vanadium oxychloride and chromium oxychloride.

Suitable inorganic solids include any inorganic compound which is available in finely-divided particulate form with hydroxyl groups on the surface thereof, for example, metal oxides such as titania and silica, silicates such as chrysotile, and aluminates such as corundum.

The conditions under which reaction between the transition metal halide and the finely-divided inorganic solid can be accomplished are subject to considerable variation. However, in order to obtain a catalyst component with exceptionally high activity and reproducible character, it has been found to be all important that the finely-divided inorganic solid be essentially dry and anhydrous at the time it is brought into contact with the transition metal halide. In addition, it is recommended that said reaction be achieved so as to allow by-products of the reaction to be eliminated from the reaction zone in order to insure that the equilibrium of said reaction is forced substantially to completion. Generally, the said reaction can be carried out by contacting said inorganic solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture. Generally speaking, 0° C. to about 300° C. constitute suitable temperatures but room temperature to about 105° C. is definitely preferred. Assuming provision is made for intimate contact of the dry inorganic solid and the transition metal halide, the minimum time required to accomplish the chemical reaction needed will vary from periods of about 10 hours at room temperature to periods of about 15 minutes at temperatures of 100° C. or over.

In accordance with the present invention, it was discovered that catalyst components of the above-described type wherein the transition metal chemically bound to the surface of the inorganic solid is in a lower valency state can be produced by exposing catalyst components of the above-described type wherein the transition metal is present in a higher valency state to ultraviolet radiation. Thus, for example, a catalyst component of the following type wherein silica represents the inorganic solid, titanium represents the transition metal and chlorine represents the halide,

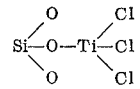

upon exposure to ultraviolet radiation in accordance with the present invention becomes

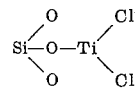

and

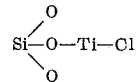

Such reduced catalyst components, i.e. catalyst components comprising a transition metal in a lower valency state are extremely valuable. For example, catalyst components of the following variety

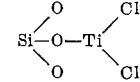

have been found to be extremely effective for the polymerization of propylene.

The intensity and length of time of exposure to the ultraviolet radiation is not normally critical, the two parameters largely being interdependent. The higher the intensity of the ultraviolet radiation, the shorter the period of time that is required to accomplish a given conversion under a given set of conditions. It is obvious that optimum conditions of intensity and time for any particular case can be readily determined.

Equally important to conversion efficiency is the wavelength range of the ultraviolet source. Each of the catalyst components produced in accordance with the teachings of the aforementioned patent applications absorbs various wave lengths of ultraviolet radiation to varying degrees. Although conversion to a reduced state can be effected by the use of an ultraviolet source which emits a broad range of wave lengths, it is preferable, for the sake of efficiency and economy, to utilize those light sources whose principal wave lengths are absorbed to the greatest extent by the particular catalyst component to be reduced. Hence. in the case of chlorotitanated silica, (i.e.

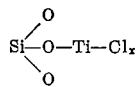

where $x$ is a number from 1 to 3) it has been found that although the broad absorption spectrum ranges from about 2000 A. to about 4000 A. maximum absorption takes place between about 2500 A. and about 3700 A. In the reduction of this particular catalyst component, therefore, it is preferred to use a light source which emits, primarily, wave lengths within the aforementioned narrower range.

Many other factors influence the yield of reduced catalyst component to some degree such as the geometry and the material of construction of the apparatus, temperature and the presence or non-presence of a solvent medium, and if a solvent is present, its type. For instance, it is known that liquid aromatic hydrocarbons generally absorb greater amounts of ultraviolet energy than liquid aliphatic hydrocarbons. Thus, in order to obtain optimum efficiency of conversion, it is desirable to utilize those liquid (STP) media which absorb the least amount of ultraviolet radiation; and more specifically, those liquid media whose ultraviolet wavelength absorption maxima are substantially different from those of the catalyst component to be reduced. Although the present invention can be practiced in the presence of liquid aromatic hydrocarbons such as toluene, xylene, cumene, p-cymene and the like, liquid aliphatic, or cycloaliphatic hydrocarbon media are preferred. Solvents which are suitable for the purposes of the present invention are compounds such as hexene, 2-methylpropane, cyclohexane, cyclohexene, isooctane, heptane, 2,3-dimethylbutane, dimethylcyclopentane, 1-bromohexane, 2-chlorohexane, 1-iodohexane and the like. Also, the present invention can be effected in the presence of gaseous (STP) hydrocarbon solvents, such as by fluidized bed irradiation using, for instance, ethylene gas as the solvent. Other gaseous solvents suitable for the purposes of the present invention are compounds such as ethane, methane, propylene, cyclopropane, butane, isobutane, butylene and the like. Obviously, then by suitable choice of media, the rate of reduction and the extent of reduction can be controlled. There follow a number of non-limiting illustrative examples:

*Example 1*

To a 1000 milliliter three neck, glass reaction vessel there is added 20 grams of "Cab-O-Sil," a pyrogenic silica, which has an average particle diameter of 20 millimicrons and a hydroxyl group content on the surface thereof of about 1.5 milliequivalents per gram. Said reaction vessel is then placed in a vacuum drying oven heated to a temperature of 150° C. for about twelve hours. Subsequently, the vessel is sealed without exposing the silica to the atmosphere and there is charged to said vessel 20 millimoles of titanium tetrachloride and 800 milliliters of anhydrous cyclohexane. The vessel is then continuously stirred and maintained at refluxing temperature for 10 hours while the contents thereof are swept by a stream of dry nitrogen. Subsequently, the extent of the reaction between the titanium tetrachloride and the silica is determined by measuring the quantity of HCl removed from the vessel by the nitrogen stream, and by testing the liquid contents of the vessel for the absence therein of titanium tetrachloride and the said silica is found to have 20 milliatoms of titanium chemically bound to the surface thereof. Next, the chlorotitanated slurry is transferred, without exposure to air, to a 1000 milliliter quartz flask equipped with a magnetic stirrer and nitrogen inlet and outlet tubes, said nitrogen outlet tube having been previously connected to a trap containing chloride-free aqueous sodium hydroxide. After one hour of sweeping of the gas phase with dry nitrogen and of continuous stirring of the slurry, analysis of the contents of said trap for chloride proves entirely negative. Three UA-3 mercury vapor lamps are then positioned immediately adjacent and facing the quartz walls of the reaction flask. The assembly of lamps and flask is then covered with aluminum foil in order to provide maximum reflectivity of the mercury vapor lamps into the reaction vessel.

The slurry is then continuously irradiated with a preponderant wavelength of 3654 A., swept by dry nitrogen and stirred for 48 hours at ambient temperature. During the irradiation procedure, 50 milliliter samples of the slurry are withdrawn at 12 hour intervals, each sample being subjected to polarograhpic analysis immediately following withdrawal from the reaction zone according to the general procedure set forth by I. M. Kolthoff and J. J. Lingane, Polarography, vol. II, Chapt. XIII, Interscience, 1952.

The following table is a compilation of the analyses:

| Hours | Percent Ti (IV) | Percent Ti (III) | Percent Ti (II) |
| --- | --- | --- | --- |
| 0 | 100 | 0 | 0 |
| 12 | 91 | 8 | 1 |
| 24 | 77 | 18 | 5 |
| 36 | 68 | 25 | 7 |
| 48 | 56 | 32 | 12 |

Moreover, it is noted upon completion of the irradiation reaction that the color of the slurry has changed from a white translucent hue to a brown opaque color. In addition, analysis of the contents of the sodium hydroxide trap reveals the presence therein of chloride ion.

*Example 2*

This example is a duplicate of Example 1 with the exception that the chlorotitanated slurry is not irradiated after transfer to the quartz reaction vessel. After 48 hours of stirring and sweeping with nitrogen, it is noted that no change in color has occurred. Moreover, the polarographic analysis indicates that no titanium valency specie other than the quadrivalent specie is present and analysis of the contents of the sodium hydroxide trap for chloride ion gives a completely negative result.

*Example 3*

To a 2000 milliliter three neck, glass reaction vessel equipped with a stirrer, a condenser and nitrogen inlet and outlet tubes, there is added 30 grams of "Alon," a pyrogenic alumina, which has an average particle diameter of about 10–40 millimicrons and a hydroxyl group content on the surface thereof of about 0.7 milliequivalents per gram. To said reaction vessel there is added 1500 milliliters of isooctane and the resulting slurry is dried by being heated to, and maintained at, the boiling point of isooctane, i.e. about 92.2° C., for about 24 hours. A water/isooctane azeotrope is then removed from the reaction vessel by periodic distillation until about 700 milliliters of distillate has been removed. The vessel is then cooled and charged with 20 millimoles of chromium trichloride. The resulting slurry is then refluxed for 10 hours with continuous stirring while the HCl produced is removed by a stream of dry nitrogen. Subsequently, the extent of the reaction between the chromium trichloride and the alumina is determined by measuring the quantity of HCl removed from the vessel by the nitrogen stream, and by testing the liquid contents of the vessel for the absence therein of chromium trichloride and the said alumina is found to have 20 milliatoms of chromium chemically bound to the surface thereof. Next, the chlorochromated slurry is transferred, without exposure to air, to the irradiation apparatus previously described in Example 1. Thereafter, irradiation is effected for 48 hours according to the procedure set forth in Example 1. Subsequently, polarographic analysis of the slurry and chemical analysis of the sodium hydroxide trap indicates that reduction of the trivalent chromium has occurred.

The catalyst components produced by the process of the present invention can be subjected to such aftertreatment as may be desired to fit them for particular uses or to impart desired properties. Thus, for example, the transition halometallated inorganic solids in which the valency of the metal has been reduced in accordance with the present invention can be combined with an organometallic compound such as triisobutylaluminum, triethyllithium aluminum bromide, octylmagnesium hydride and the like to produce a catalyst suitable, for example, for the polymerization and copolymerization of α-olefins such as ethylene and styrene, diolefins such as butadiene, and mixtures thereof. It is pointed out, however, that when irradiation of a halometallated inorganic solid, for example

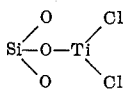

occurs to the extent that the following specie is produced

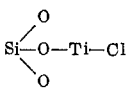

oftentimes no subsequent reaction with an organometallic compound is necessary in as much as such compounds are often inherently catalytically active for the polymerization of α-olefins.

Obviously, many changes may be made in the above-described examples and procedure without departing from the scope of the invention. For example, although only titanium tetrachloride is mentioned in the above examples, other transition metal halides are suitable as is set forth previously in detail in column 1. For example, titanium tetraiodide, vanadium tetrachloride and zirconium tetrachloride are also entirely suitable.

Also, pyrogenically coformed, or coprecipitated metal oxides, or metal oxides coformed with, or mixed with, other compounds are suitable finely-divided inorganic solids for the purposes of the present invention.

Furthermore, it is obvious that the nature of the ultraviolet source is not critical and that ultraviolet sources of a type other than mercury vapor lamps can be utilized. For instance, carbon arcs of various types can also be utilized.

Accordingly, it is intended that the above disclosure be regarded as illustrative and in no way limiting the scope of the invention.

What I claim is:

1. A novel process for producing a polymerization catalyst component comprising a finely-divided inorganic solid carrying in chemical combination surface structures chosen from the group consisting of:

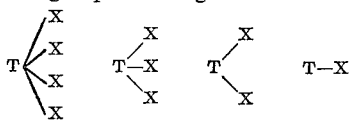

where T is a metal chosen from the group consisting of the meals of Groups IVa, Va and VIa; each X is any halogen; and where said structures are chemically linked directly from T to at least one oxygen atom on the surface of said solid, and where T is in a lower valency state, which process comprises exposing to ultraviolet light a finely-divided inorganic solid carrying in chemical combination surface structures chosen from the group consisting of

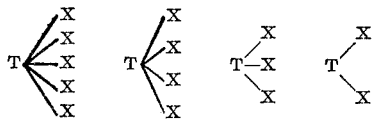

where T is a metal chosen from the group consisting of the metals of Groups IVa, Va and VIa; each X is any halogen; and where said structures are chemically linked directly from T to at least one oxygen atom on the surface of said solid.

2. The process of claim 1 wherein each X in said surface structures is chosen from the group consisting of chlorine, bromine and iodine.

3. The process of claim 1 wherein T in said surface structures is a metal of Group IVa.

4. The process of claim 3 wherein each X in said surface structures is chlorine.

5. The process of claim 1 wherein T in said surface structures is titanium.

6. The process of claim 1 wherein T in said surface structures is a metal of Group Va.

7. The process of claim 1 wherein T in said surface structures is vanadium.

8. The process of claim 1 wherein T in said surface structures is a metal of Group VIa.

9. The process of claim 1 wherein T in said surface structures is chromium.

10. A novel process for producing a polymerization catalyst component which comprises exposing to ultraviolet light the product of a metathetical reaction between
   (a) a compound conforming to the formula:

$$TO_aX_b$$

where T is a metal chosen from the group consisting of the metals of Groups IVa, Va and VIa; O is oxygen; $a$ is a number from 0 to 2; each X is any halogen; and $b$ is a number from 1 to 6; and (b) hydroxyl groups on the surface of a particulate finely-divided inorganic solid, where, in said product, the valence state of T is the same as in said compound but at least one less halogen atom is attached to T than was attached thereto in said compound.

11. The process of claim 10 wherein said compound conforming to the formula $$TO_aX_b$$

is a compound of a Group IVa metal.

12. The process of claim 10 wherein in the formula $$TO_aX_b$$

$a$ is 0.

13. The process of claim 10 wherein said formula $$TO_aX_b$$

T is titanium and $a$ is 0.

14. The process of claim 10 wherein said compound conforming to the formula $$TO_aX_b$$

is titanium tetrachloride.

15. A novel process for producing a polymerization catalyst component which comprises reacting, while eliminating gaseous by-products from the reaction medium, at temperatures of from between about 0° C. and about 300° C. for a minimum period ranging from about 10 hours to about 15 minutes, the higher the temperature used the shorter being the minimum time required, a particulate finely-divided inorganic solid having hydroxyl groups on the surface thereof which has been dried so as to remove substantially all the free and physically bound water therefrom and a compound conforming to the formula $$TO_aX_b$$

where T is a metal chosen from the group consisting of the metals of Groups IVa, Va and VIa; O is oxygen; $a$ is a number from 0 to 2; each X is any halogen; and $b$ is a number from 1 to 6; and exposing the resulting solid product of said reaction to ultraviolet light.

16. The process of claim 15 wherein the reaction between said compound conforming to the formula $$TO_aX_b$$

and said inorganic solid is accomplished at temperatures of from about 20° C. to about 105° C.

17. The process of claim 15 wherein in the formula $$TO_aX_b$$

T is a metal of Group IV*a*.

18. The process of claim 15 wherein in said formula $$TO_aX_b$$

*a* is 0.

19. The process of claim 15 wherein in said formula $$TO_aX_b$$

T is titanium and *a* is 0.

20. The process of claim 18 wherein said compound conforming to the formula $$TO_aX_b$$

is titanium tetrachloride.

References Cited by the Examiner
UNITED STATES PATENTS 3,127,334  3/1964  Heffels _____ 204—157

JOHN H. MACK, *Primary Examiner.*

H. S. WILLIAMS, *Assistant Examiner.*